United States Patent
Fujii et al.

(10) Patent No.: US 6,933,649 B2
(45) Date of Patent: Aug. 23, 2005

(54) METHOD OF INSTALLATION OF A LAMINATED STATOR CORE STACK IN THE MOTOR CASING

(75) Inventors: Yoshio Fujii, Kyoto (JP); Yosuke Yamada, Kyoto (JP); Akira Otagaki, Toyota (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/831,191

(22) Filed: Apr. 26, 2004

(65) Prior Publication Data

US 2004/0217669 A1 Nov. 4, 2004

(30) Foreign Application Priority Data

Apr. 25, 2003 (JP) ........................................ 2003-120825
Feb. 4, 2004 (JP) ........................................ 2004-027506

(51) Int. Cl.⁷ .............................................. H02K 1/18
(52) U.S. Cl. ........................... 310/216; 310/218; 29/596
(58) Field of Search ............................. 310/216, 218; 29/596

(56) References Cited

U.S. PATENT DOCUMENTS

| | | | | |
|---|---|---|---|---|
| 4,564,779 A | * | 1/1986 | Terry, Jr. ..................... | 310/258 |
| 5,382,859 A | * | 1/1995 | Huang et al. ................ | 310/216 |
| 5,592,731 A | * | 1/1997 | Huang et al. ................ | 29/596 |
| 6,020,667 A | * | 2/2000 | Carey et al. ................. | 310/216 |
| 6,741,005 B2 | * | 5/2004 | Vohlgemuth ................ | 310/216 |

FOREIGN PATENT DOCUMENTS

| | | | | |
|---|---|---|---|---|
| JP | Y-H07-56591 | 12/1995 | | |
| JP | A-H11-215745 | 8/1999 | | |
| JP | A-2000-324728 | 11/2000 | | |
| JP | A-2001-8388 | 1/2001 | | |
| JP | A-2002-27688 | 1/2002 | | |
| JP | A-2002-95193 | 3/2002 | | |
| JP | 2002359940 A | * 12/2002 | ............ | H02K/1/18 |

* cited by examiner

Primary Examiner—Joseph Waks
(74) Attorney, Agent, or Firm—Shinjyu Global IP

(57) ABSTRACT

A stator core stack formed by laminating a plurality of straight cores having a core back, a tooth, and a linking part for linking the core backs. In the stator core stack, the linking portion is folded and deformed the linking portion so as to join an end surfaces of the straight core, and a core back outer peripheral portion is formed at the back side of the core back, and the diameter of the core back outer peripheral portion is formed same as or shorter than the diameter of the inner peripheral surface of the housing, and is disposed in the housing. A bar-like member is press-fitted in the axial direction between both the end surfaces of the straight core. In other example of motor, an engaging portion extending in the axial direction and projecting in the radial inward direction is formed in the inner peripheral surface of the housing, and the end surfaces of the straight core are engaged or fitted with the engaging portion.

18 Claims, 16 Drawing Sheets

METHOD OF INSTALLATION OF A LAMINATED STATOR CORE STACK IN THE MOTOR CASING

CROSS REFERENCE TO RELATED APPLICATION

The disclosure of Japanese Patent Application No.2003-120825 filed Apr. 25, 2003 and No.2004-027506 filed Feb. 4, 2004 including specification, drawings and claims is incorporated herein by reference in its entirety.

FIELD OF THE INVENTION

The present invention relates to a motor, and more particularly to an inner rotor type motor.

BACKGROUND OF THE INVENTION

Hitherto is known an inner rotor type motor in which a magnet is disposed on an inner peripheral side of a stator. In such an inner rotor type motor, as shown in a plan view in FIG. 14, a plurality of core pieces C1 are coupled by way of thin linking portions, so that a straight core C is formed. The straight core C is a member formed by blanking a flat plate made of magnetic material such a silicon steel plate, and a stator core stack U is formed by laminating a plurality thereof, as shown in a perspective view in FIG. 15. Each core piece has a core back Y and a tooth T. The stator core stack U has resin-made insulators, not shown, formed from both sides in the laminating direction (in the vertical direction in FIG. 15) of the straight cores C, and a winding P shown in FIG. 16 is wound on each tooth T in a straight state of the straight core C, as shown in FIG. 15.

After the winding P is wound on the tooth T, the linking portions of respective core piece C1 are folded and deformed in an annular form so as to join end surfaces X, X in the peripheral direction (see FIG. 15) of the stator core stack U, and thereby a stator S is formed. The stator S is fixed in a cylindrical housing H by such means as press-fitting and/or adhesive, as shown in a radial sectional view in FIG. 16.

At this time, an outer diameter of the stator S is formed slightly smaller than an inner diameter of the housing H, and an outer diameter size of the stator S has an influence on motor characteristics. That is, if an outer diameter size of the stator S is excessively smaller than an inner diameter size of the housing H, when the stator S is press-fitted into the housing H, a face pressure between an inner peripheral surface of the housing H and an outer peripheral surface of the stator S is becomes small, so that the stator S is not fixed firmly to the housing H. As a result coaxiality of the stator S and housing S deteriorates poor, and the stator S vibrates largely when the motor rotates.

To the contract, if an outer diameter size of the stator S is approximately equal to an inner diameter size of the housing H, when the stator S is press-fitted into the housing H, scoring forms in the housing H and/or the stator S at a contact area of the stator S and housing H, which leads to vibration of the stator S during motor rotation. In addition, if the stator S is press-fitted into the housing H, in such a scored state, the slot of the adjacent tooth T and tooth T in the peripheral direction of the stator S is uneven, and a magnetic field generated in the stator S by application of current is uneven in the peripheral direction, and the characteristic of the stator S deteriorates.

When the stator S is secured in the housing H by an adhesive, the stator S must be temporarily secured in the housing H by some means, until the adhesive is dried and moreover when an inflammable adhesive is used, a fireproof structure is newly required in the stator S and/or the housing H.

SUMMARY OF THE INVENTION

It is hence a primary object of the invention to provide a motor capable of fixing or securing a stator easily in a housing.

It is another object of the invention to provide a motor capable of fixing or securing a stator firmly in a housing.

To achieve these objects, according to a first aspect of the invention, there is provide a motor in which the diameter of the core back outer peripheral portion is set to be equal to or shorter than the diameter of an inner peripheral surface of the housing. Therefore, scoring can be prevented from forming in the stator and/or the housing due to contact between the stator and the housing. After the stator is inserted into the housing, a bar-like member is press-fitted between both end surfaces of the stator core stack. As a result, the slot between the end surfaces is expanded by the bar-like member, and a surface pressure is created between the core back outer peripheral portion and the housing inner peripheral surface. Hence, the stator is fixed in the housing.

According to another aspect of the invention, there is provided another motor in which the diameter of the core back outer peripheral portion is set to be equal to or shorter than the diameter of inner peripheral surface of the housing. Therefore, scoring can be presented from forming in the stator and/or the housing due to contact between the stator and the housing. In addition, in the motor of the another aspect, the inner peripheral surface of housing has an engaging portion extending in the axial direction and projecting inward in the radial direction, and the end surface of the stator core stack is fitted in or engaged with the engaging portion. Accordingly, when the stator is inserted into the housing, the engaging portion can be used as a marking for inserting the stator into the housing, so that the stator can be easily fixed in the housing, and an assembling work of the motor can be simplified. Further, after the stator is fixed in the housing by the engaging portion, the stator can be prevented from rotating relative to the housing.

DETAILED DESCRIPTION OF THE PREFERRED EMBODIMENTS

Embodiments of motor of the invention will be described below with reference to FIG. 1 to FIG. 16. In explanation of embodiments of the invention, for the sake of convenience, upper and low directions in each drawing are mentioned as upper and low directions, but they are not intended to specify directions in an actual mounting state.

1. First Embodiment

Figure 1:
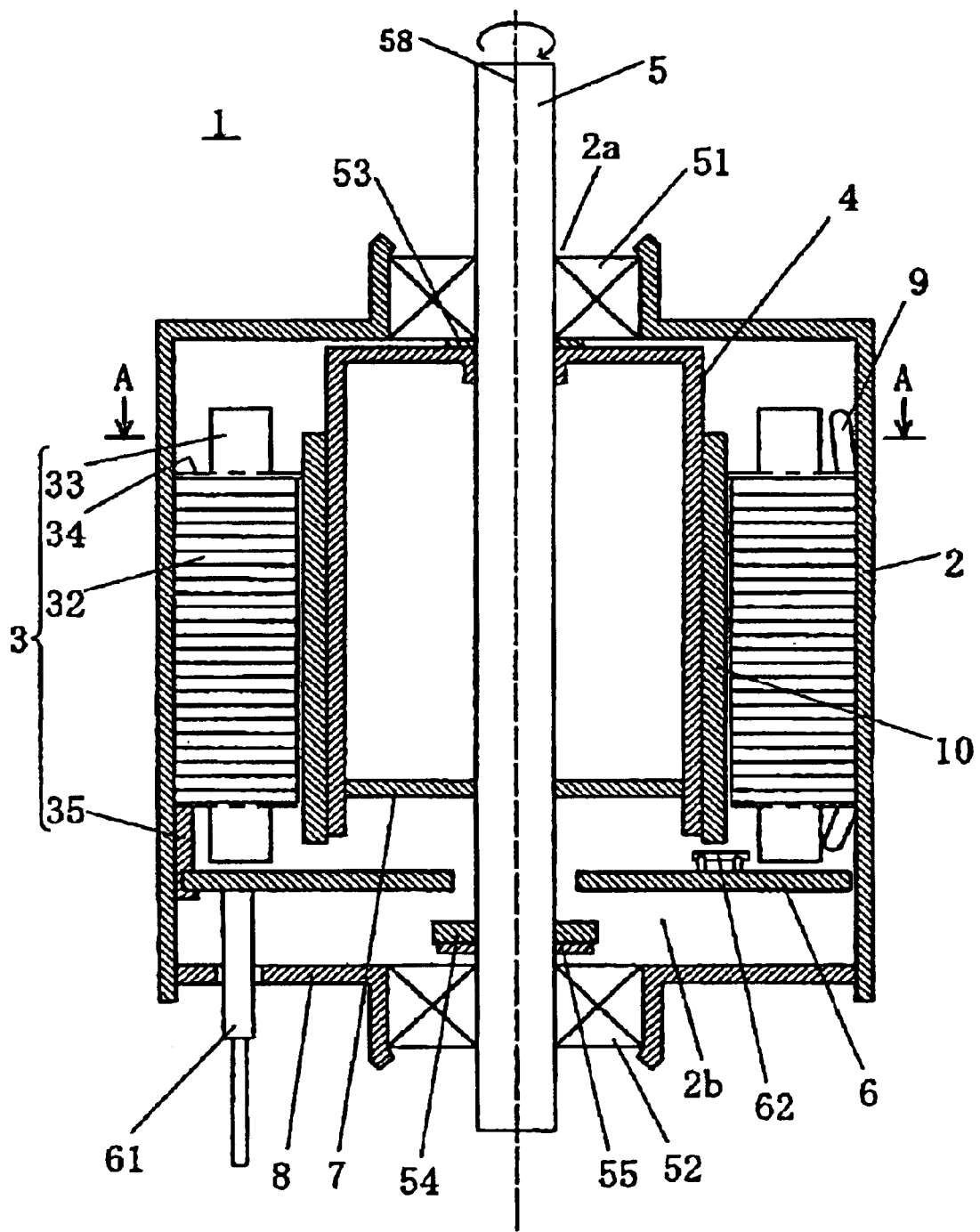
FIG. 1 is a sectional view in an axial direction showing a motor according to a first embodiment of the invention.
Figure 2:
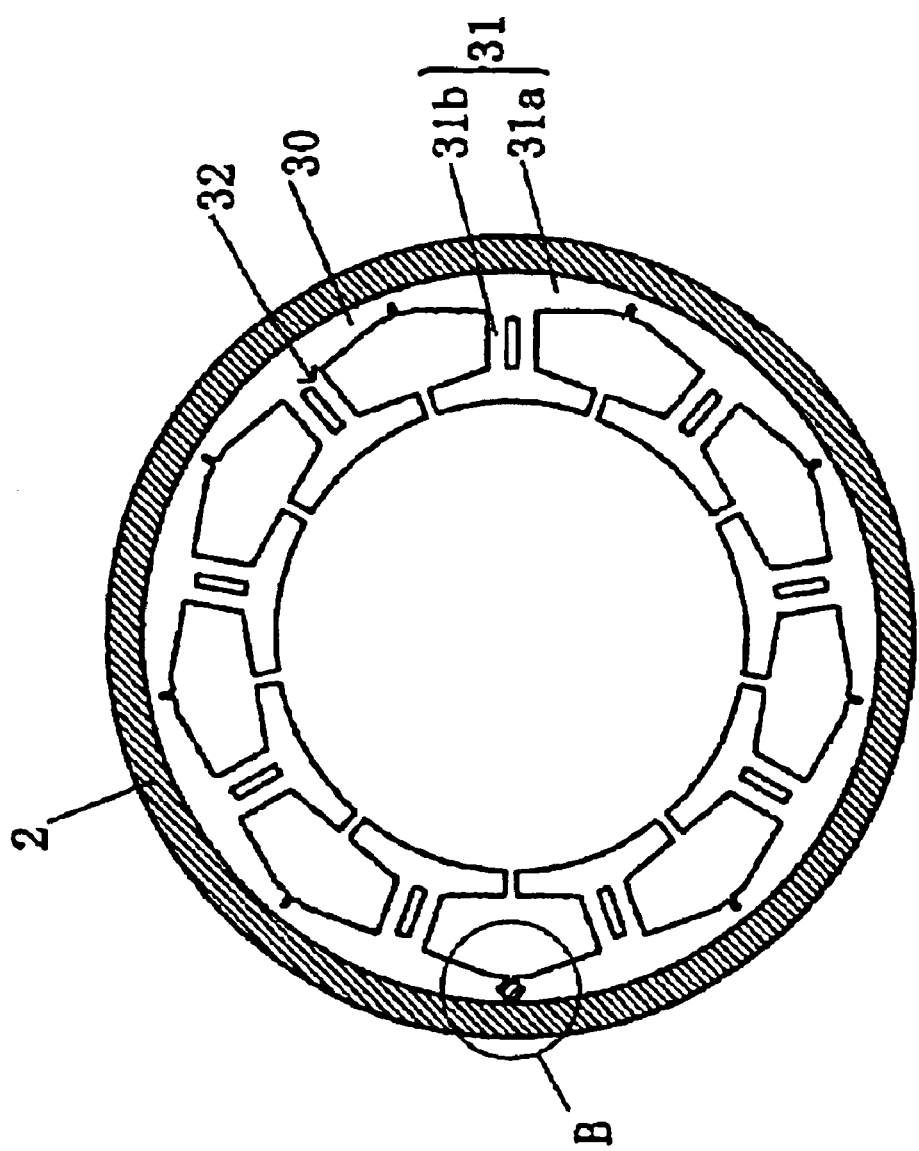
FIG. 2 is a sectional view of the motor taken along line A—A in FIG. 1.

A motor 1 according to a first embodiment of the invention will be explained below with reference to the accompanying drawings. FIG. 1 is a sectional view in an axial direction showing the motor 1 in the first preferred embodiment, and FIG. 2 is a sectional view of the motor taken along line A—A in FIG. 1. In FIG. 2, peripheral members of a rotary shaft and windings are omitted.

The motor 1 comprises a cylindrical housing 2 having a small opening portion 2a formed on an upper side in an axial direction which is positioned on the other end side in the axial direction, and a large opening portion 2b with a larger diameter than the small opening portion 2a formed on a lower side in the axial direction which is positioned on one end side in the axial direction, a stator 3 fixed or secured on an inner peripheral surface of the housing 2, a circuit board 6 attached on the stator 3, and a plate 8 attached to the housing 2.

An upper bearing 51 is fixed in The small opening portion 2a on the upper side in the axial direction of the housing 2, and the plate 8 having a central axial hole is fixed to the large opening portion 2b formed on the lower side in the axial direction of the housing 2. A lower bearing 52 is fixed in the axial hole of the plate 8, and a rotor is rotatably supported by the upper bearing 51 and the lower bearing 52.

The rotor comprises a rotation axis 58, a rotary shaft 5 supported by the upper bearing 51 and the lower bearing 52, a cylindrical yoke 4 disposed between the upper bearing 51 and the lower bearing 52, and fixed on this rotary shaft 5 to rotate together with the rotary shaft 5, and an annular magnet 10 fixed to an outer peripheral surface of the yoke 4 by adhesive or the like.

The rotary shaft 5 penetrates the housing 2, the yoke 4, a cap 7, the circuit board 6 described below, and the plate 8 in the axial direction. On the rotary shaft 5, a resin washer 53 is fixed at a positioned between an upper end surface of the yoke 4 and the upper bearing 51, and a metal washer 54 and a resin washer 55 are respectively fixed slightly above in the axial direction from the lower bearing 52 of the rotary shaft 5. The metal washer 54 prevents the rotary shaft 5 from coming off.

The yoke 4 is an annular cylindrical member made of magnetic material, such as SECE material (galvanized steel plate), and is disposed concentrically with the housing 2. On an inner peripheral surface of the large opening portion 2b on the lower side in the axial direction, the cap 7 having a central axial hole is provided. As described above, on an outer peripheral surface of the yoke 4, the magnet 10 opposite in the radial direction to the stator 3 is fixed or secured by adhesive or the like. The yoke 4 is fixed in the rotary shaft 5 by press-fitting the rotary axial 5 in the axial hole on the upper side in the axial direction and the axial hole of the cap 7.

The circuit board 6 fixed to an insulator 35 is provided between the yoke 4 and the stator 3, and the metal washer 54 in the axial direction, and the circuit board 6 is attached with a lead wire 61 for connection with windings 33 and an external circuit, and a Hall element 62 is mounted on a top of the circuit board 6.

As shown in FIG. 1 and FIG. 2, the stator 3 comprises a stator core stack 32, windings 33 wound on the stator core stack 32, and insulators 34, 35 sandwiching the stator core stack 32 from the upper side and the lower side in the axial direction. The stator core stack 32 is a laminated body of a plurality of straight cores 30 having a plurality of core pieces 31 consecutive in the peripheral direction, laminated in the axial direction as a shown in FIG. 1. Each core piece 31 has a core back 31a extending like an arc in a back side, and a tooth 31b projecting inward in the radial direction from the center of the core back 31a. Each tooth 31b is formed approximately in a T shape in a plane section (in plan view) vertical to the rotary axial line of the motor 1, and a winding 33 is wound on a bar-like portion extending in the radial direction of the T shape.

In a manufacturing method of such a stator 3, first of all, a straight core 30 with a plurality of core pieces 31 coupled in series through thin linking portions 31c by blanking an flat rolled magnetic steel sheets and strip. Each core piece 31 has a core back 31a formed between linking portions 31c, and a T-shaped tooth 31b extending perpendicularly from the center of the core back 31a, and in the perpendicular bar-like portion of the tooth 31b, a straight core positioning portion 31d as groove portion (or projecting portion) in plane view and projecting portion (or groove) in bottom view is formed simultaneously when blanking the flat rolled magnetic steel sheets and strip. Of the core pieces 31 being coupled, the core pieces 31 excluding the core pieces 31A and 31B at both ends are formed symmetrically on both sides of each tooth 31b.

Figure 3:
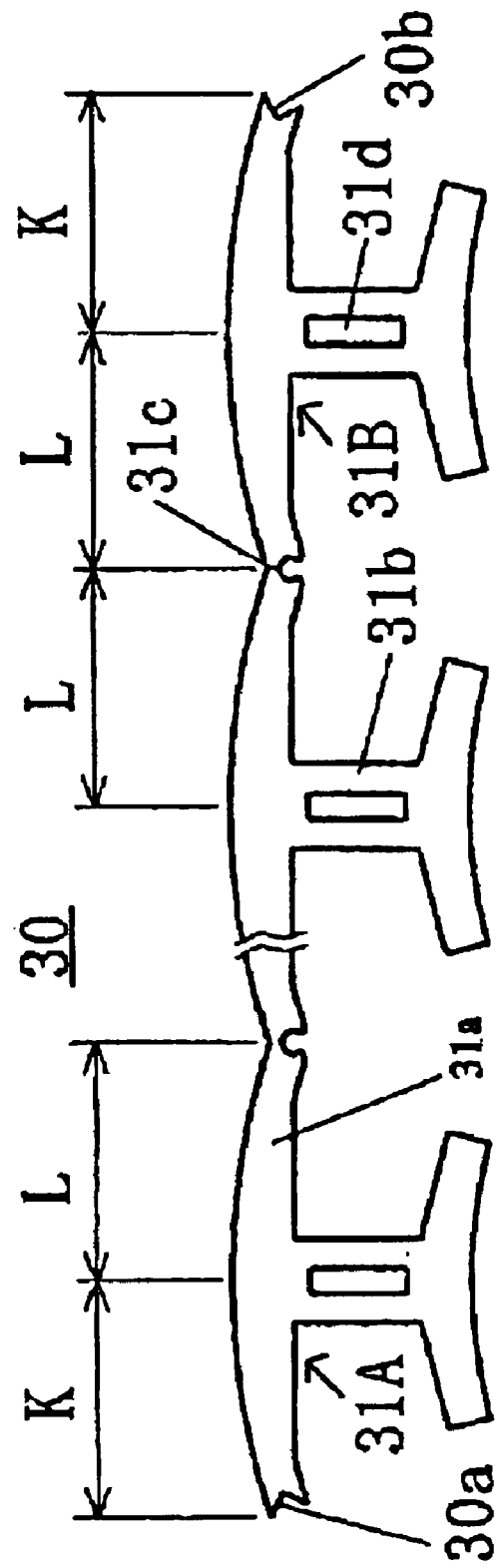
FIG. 3 is a plan view showing a straight core used in the motor in FIG. 1.

As shown in FIG. 3, the length L of the core back 31a having symmetrical core pieces 31 satisfies the condition of H=2L X n, where H is the peripheral length of the inner periphery of the housing 2, and n is the total number of core pieces 31 including the core pieces 31A and 31B at both ends. The core pieces 31A and 31B at both ends are slightly shorter in length K than the length L of the linking portion 31c side. In addition, the both end surfaces 30a and 30b of the core pieces 31A and 31B at both ends are formed in V-shape in plan view, that is, two surfaces intersecting with each other.

The straight core 30 is formed by laminating a plurality of straight core positioning portions 31d of each straight core 30 so as to coincide in the axial direction as shown in FIG. 1. Thus, the stator core stack 32 is formed. Next, the stator core stack 32 is enclosed by insulators 34, 35 from the upper side and lower side of the axial direction, and a winding 33 is wound around the laminated tooth 31b of the stator core stack 32. Finally, the linking portions of the plurality of laminated core pieces 31 are folded and deformed in an annular form, and a stator 3 is formed. At this time, the outer peripheral length of the stator 3 is shorter than the inner peripheral length of the housing 2 by 2 (nL-K).

The assembling method of the motor 1 is explained.

Figure 4:
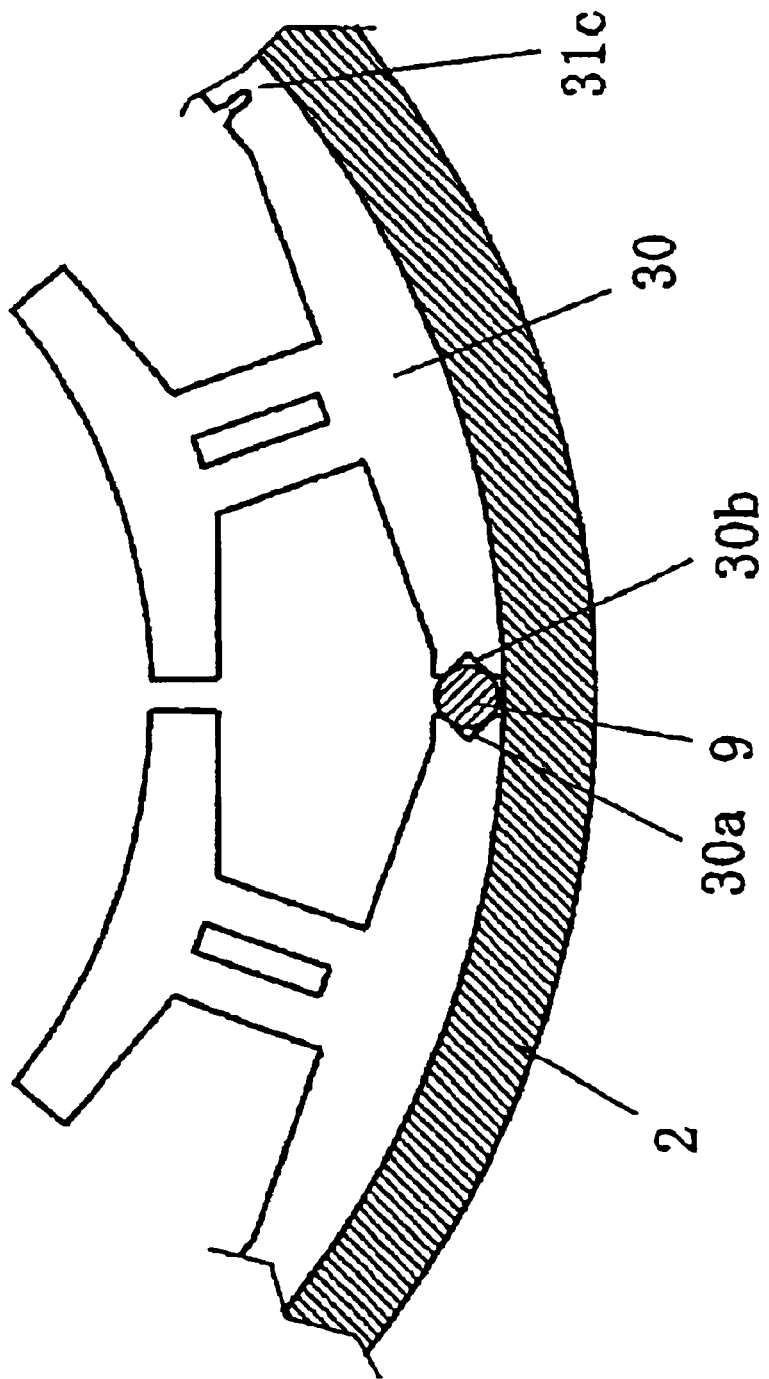
FIG. 4 is a magnified view of a portion B in FIG. 2.

First, the upper bearing 51 is press-fitted into the small opening portion 2a of the housing 2. The lower bearing 52 is press-fitted into the plate 8. The stator 3 is inserted from the large opening portion 2b side of the housing 2. As mentioned above, since the outer peripheral length of the straight core 30 is shorter than the inner peripheral length of the housing 2, damaging of the stator 3 and/or housing 2 can be prevented. Then, as shown in FIG. 4 as magnified view of part B in FIG. 2, a pin 9 is inserted as a bar-like member into a rhombic gap extending in the axial direction formed between the both ends 30a and 30b of the stator 3. At this time, the pin 9 is inserted until penetrating through the stator 3 in the axial direction. The pin 9 is a deformable member in circular shape in plan view, formed of piano wire, SK material, SUS material or other magnetic material, by cutting, drawing or other processing means. The pin 9 has a radius larger than that of a virtual circle inscribing the rhombic gap formed when the end surfaces 31a and 31b of the cores 31A and 31B at both end surfaces of the laminated stator 3 in plan view, and is smaller than (nL-K). Since the pin 9 is almost circular in plan view, by press-fitting the pin 9, the gap between the end surface 30a and end surface 30b formed in the core pieces 31A and 31B at both ends is expanded by the pin 9. At this time, a total of four sides of the end surface 30a and end surface 30b linearly contact with the pin 9 in the axial direction, and the press-fitting force is sufficiently transmitted to the stator core stack 32, and a uniform surface pressure is formed between the outer peripheral surface of the stator core stack 32 and the inner peripheral surface of the housing 2. Therefore, a greater surface pressure can be generated by a small force. Besides, since the end surface 30a and end surface 30b are formed in V-shape, by the radial inward side of the total of four end surfaces of the end surface 30a and end surface 30b, the pin 9 is prevented from moving in the radial inward direction, and the surface pressure can be assured securely unless the pin 9 is removed from the gap of the end surfaces 30a and 30b. Hence, the stator 3 can be more firmly fixed in the housing 2. The end surface 30a and 30b are not limited to V-shape, but may be formed in a concave shape. In such a case, as going deeper into the bottom of the concave shape, the interval between the both surfaces of the concave shape should be narrower gradually.

Next, the resin washer 53, the yoke 4 having the magnet 10, and the cap 7 are press-fitted into the rotary shaft 5. In the housing 2 where the stator 3 is fixed, the rotary shaft 5 is accommodated together with the yoke 4 and others, and the leading end portion of the rotary shaft 5 is inserted into the bearing 51. The circuit board 6 mounting the Hall element 62 and others is fixed in the housing 2, and the metal washer 54 and resin washer 55 are press-fitted beneath the axial direction from the circuit board 6 in the rotary shaft 5. Finally, by closing the housing 2 with the plate 8 having the lower bearing 52, a motor 1 is assembled.

In this embodiment, without fixing by force by press-fitting the stator 3 into the housing 2 or without fixing by using adhesive, the stator 3 can be easily fixed in the housing 2, and the reliability and producibility of the motor may be enhanced.

Figure 5:
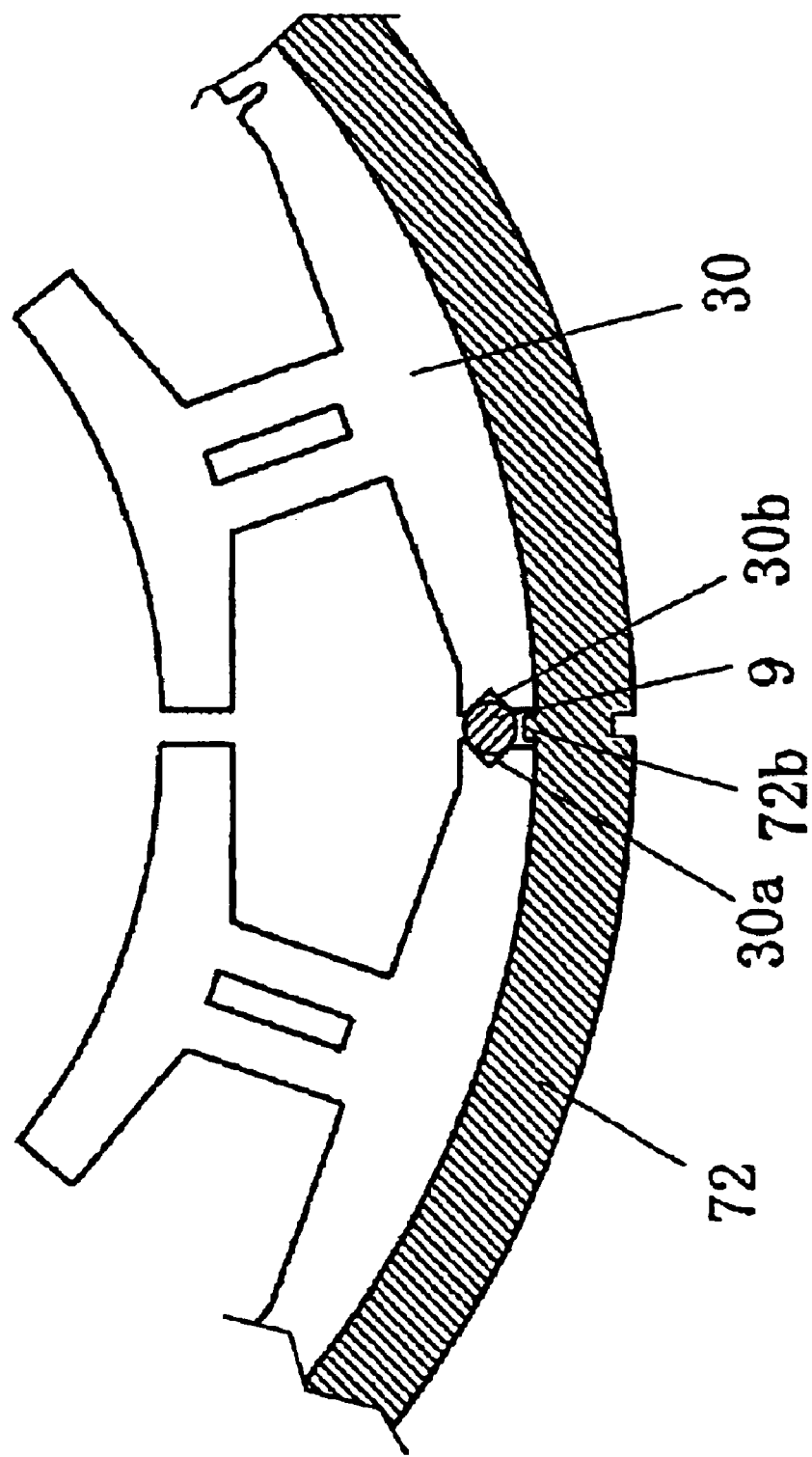
FIG. 5 is a sectional view in a radial direction showing a main portion of a motor in a modified example of the first embodiment of the invention.

FIG. 5 is a sectional view showing part of a modified example of the motor in the first embodiment, which corresponds to FIG. 4 of the first embodiment. In this modified example, too, same as in the first embodiment, both end surfaces 30a, 30b of the straight core 30 are formed in a V-shape, and the pin 9 is prevented from moving in the radial inward direction, and the press-fitting force of the pin 9 is sufficiently transmitted to the stator 3 by way of the total of four sides of the both end surfaces 30a, 30b. Therefore, the same action and effect as in the first embodiment are obtained. In addition, unlike the first embodiment, a move defining portion 72b is formed in the inner peripheral surface of a housing 72. The move defining portion 72b is formed by pressing the outer peripheral surface of the housing 72 inward in the radial direction by a die, and denting the outer peripheral surface of the housing 72 by this pressing force, and then projecting the inner peripheral surface of the housing 72. The move defining portion 72b is formed in part or whole in the axial direction on the housing 72. Therefore, when inserting the stator 3 into the housing 72, the both end surfaces 30a, 30b of the stator 3 are engaged with the move defining portion 72b, and the peripheral direction of the stator 3 can be determined easily in the housing 72. After inserting the stator 3 into the housing 72, if the stator 3 is moved in the circumferential direction, the end surfaces 30a and 30b of the straight core 30 are engaged with the move defining portion 72b, and the stator 3 is prevented from moving in the circumferential direction. After press-fitting of the pin 9, same as in the first embodiment, a surface pressure is applied between the outer peripheral surface of the straight core 30 and the inner peripheral surface of the housing 72, so that the stator 3 is fixed in the housing 72.

2. Second Embodiment

Figure 6:
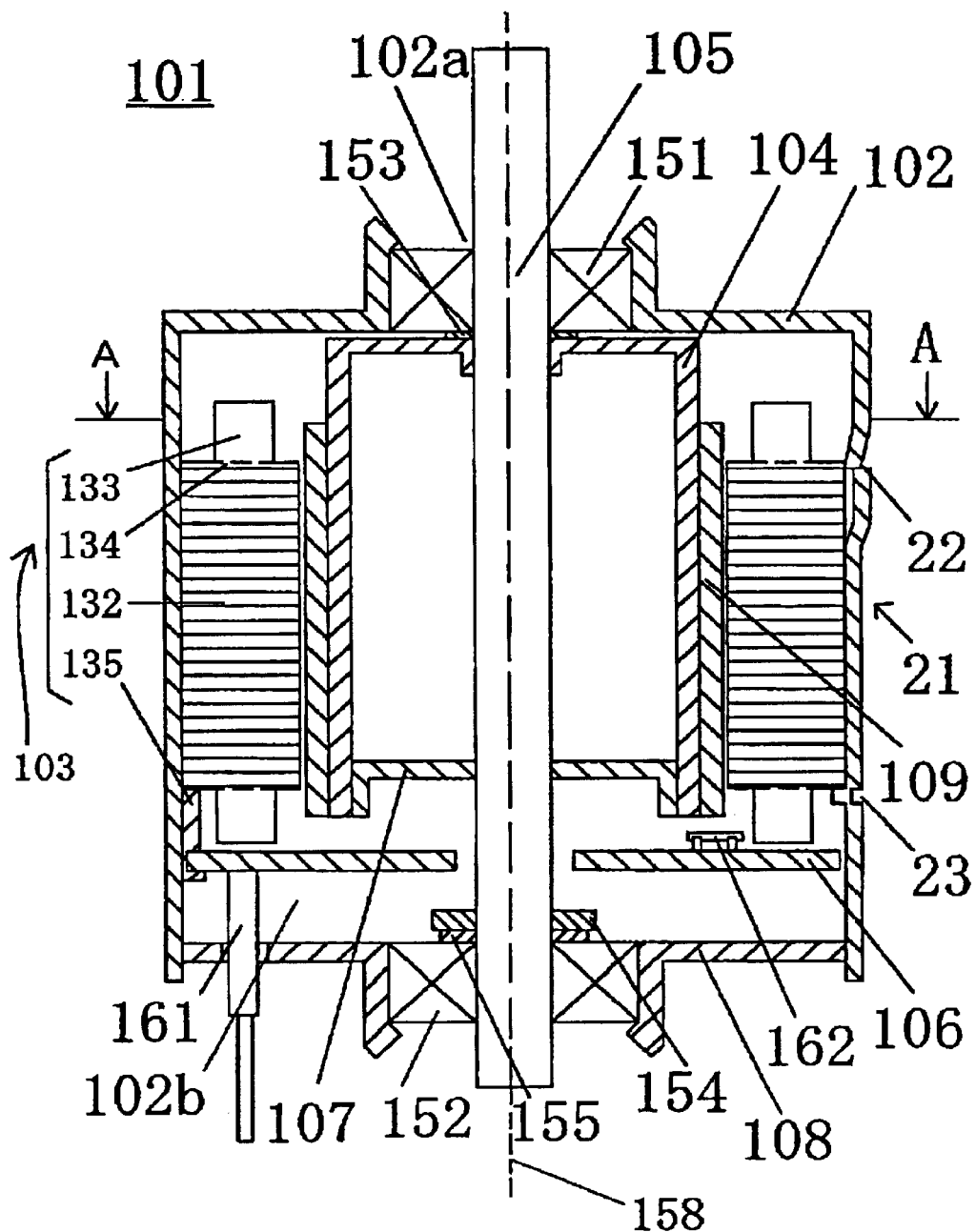
FIG. 6 is a sectional view in an axial direction showing a motor in a second embodiment of the invention.
Figure 7:
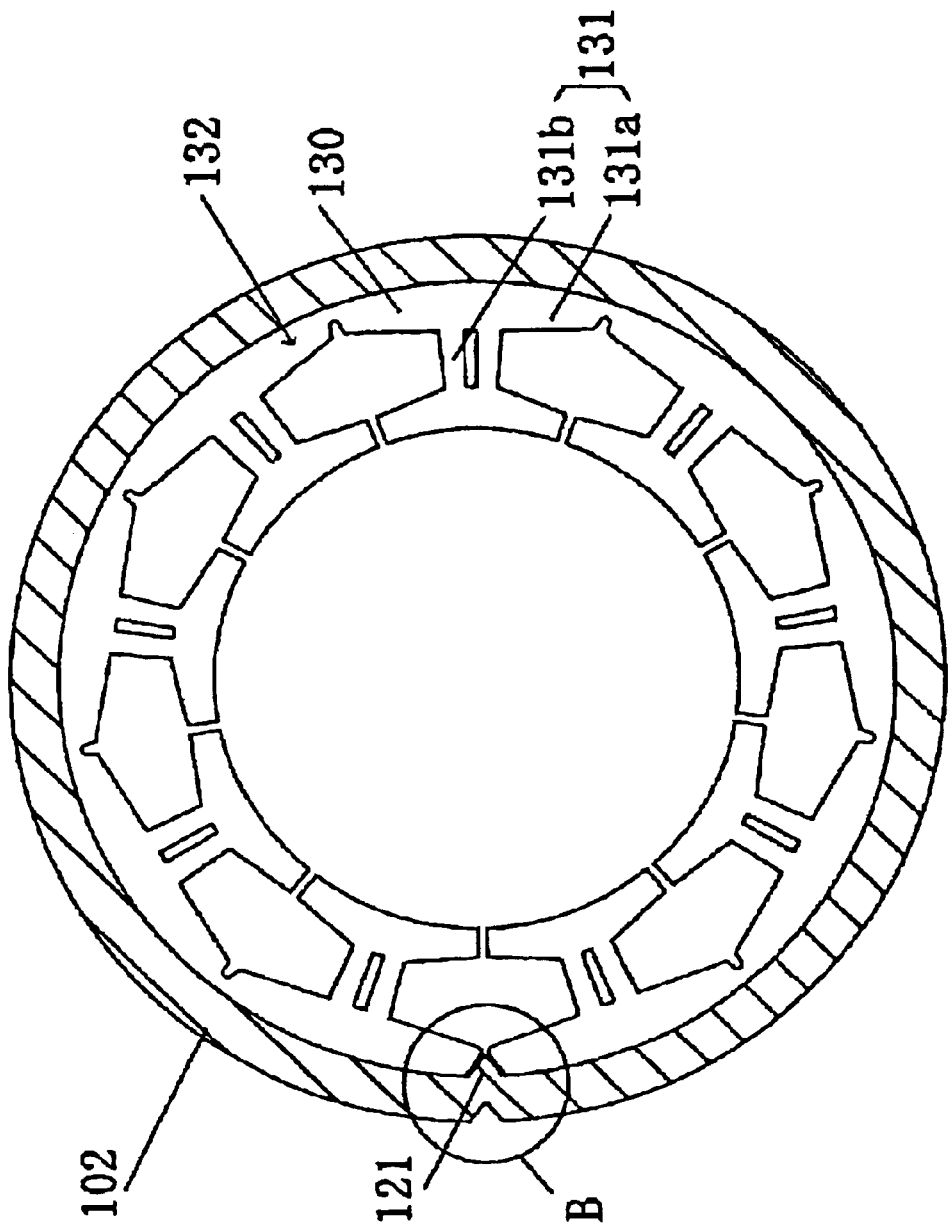
FIG. 7 is a sectional view of the motor taken along line A—A in FIG. 6.

FIG. 6 is a sectional view in axial direction showing a motor 101 in a second preferred embodiment of the invention. FIG. 7 is a sectional view A—A in FIG. 6. In FIG. 7, peripheral members of the rotary shaft and winding are omitted. The motor 101 in this embodiment is basically similar in structure to the first embodiment, and reference numerals of the corresponding parts are indicated in the basic unit of 100, and only different parts are explained below.

Figure 8:
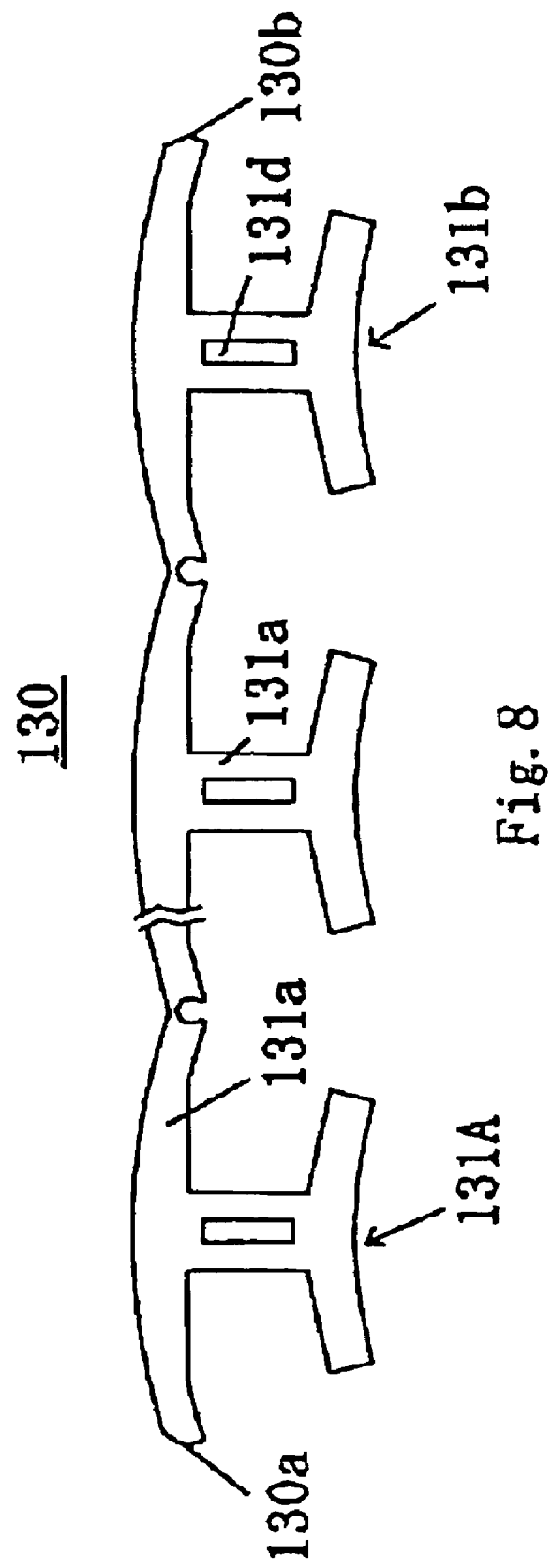
FIG. 8 is a plan view showing a straight core used in the motor in FIG. 6.
Figure 9:
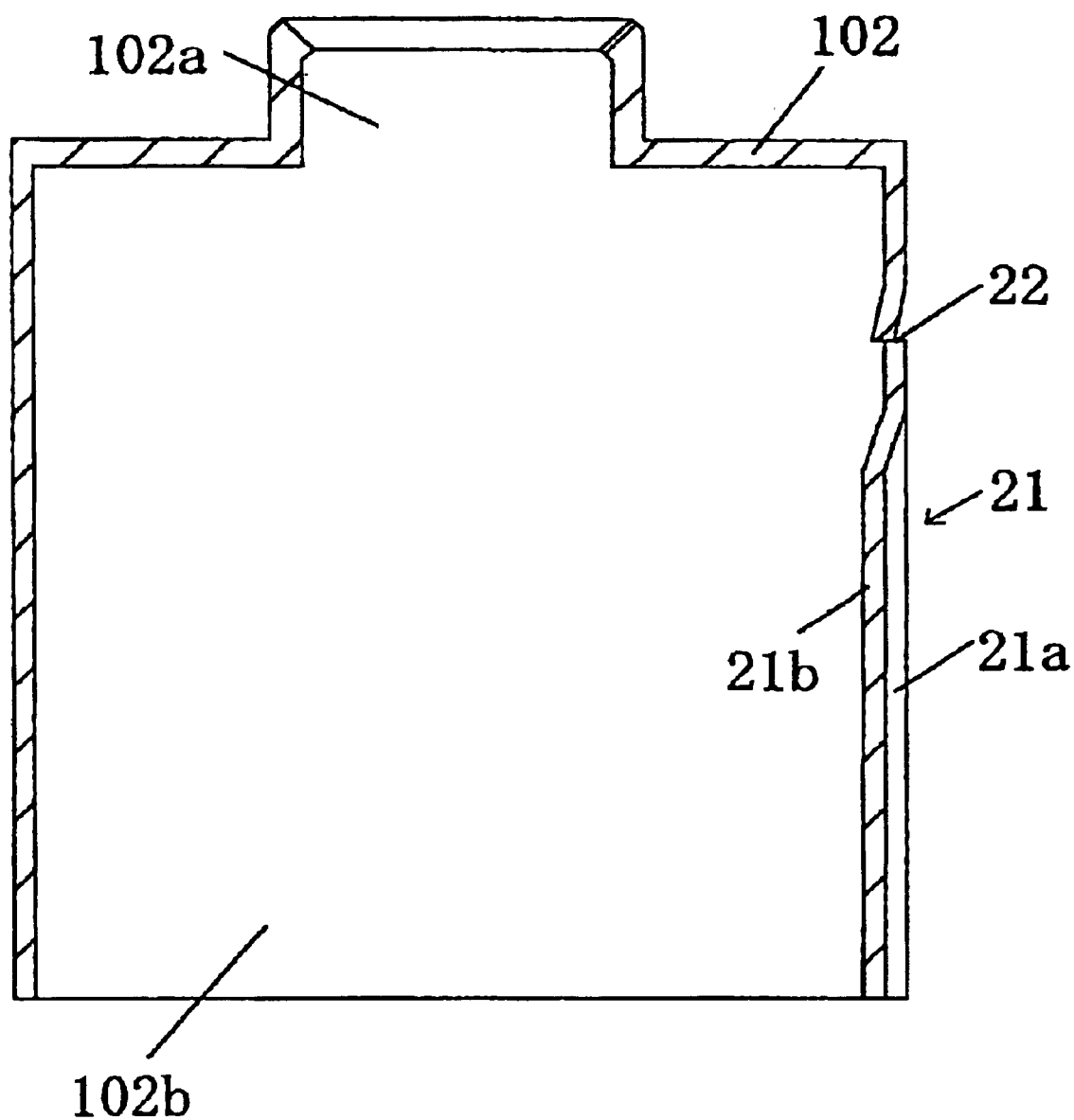
FIG. 9 is a sectional view in an axial direction showing a housing used in the motor in FIG. 6.

In this embodiment, as shown in FIG. 8, a notch in plan view is formed in a back side end of core back 131a out of both end surfaces 130a and 130b of core pieces 131A and 131B at both end surfaces of a straight core 130.

Figure 10:
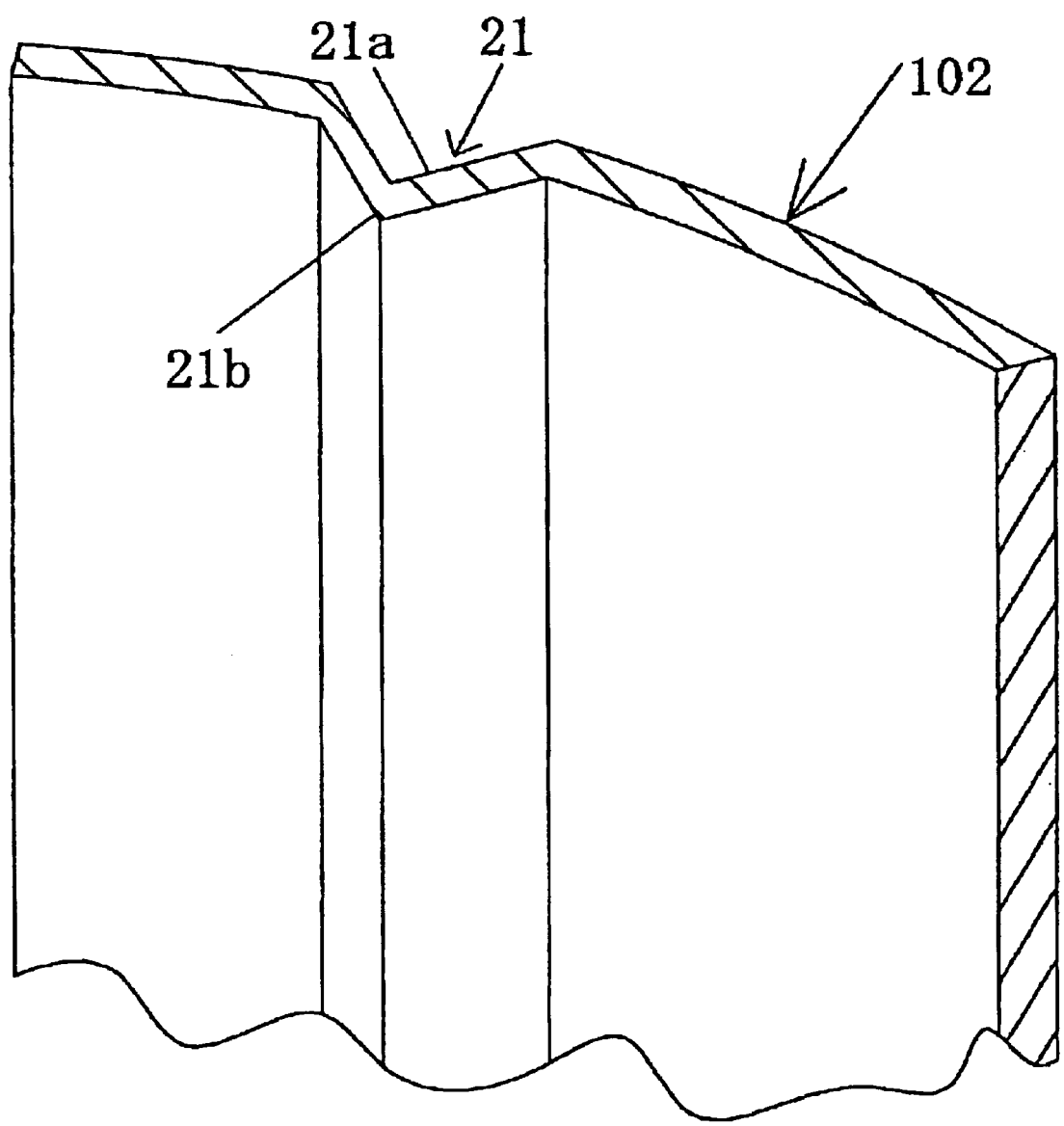
FIG. 10 is a magnified perspective view showing a main portion of the housing used in the motor in FIG. 6.
Figure 11:
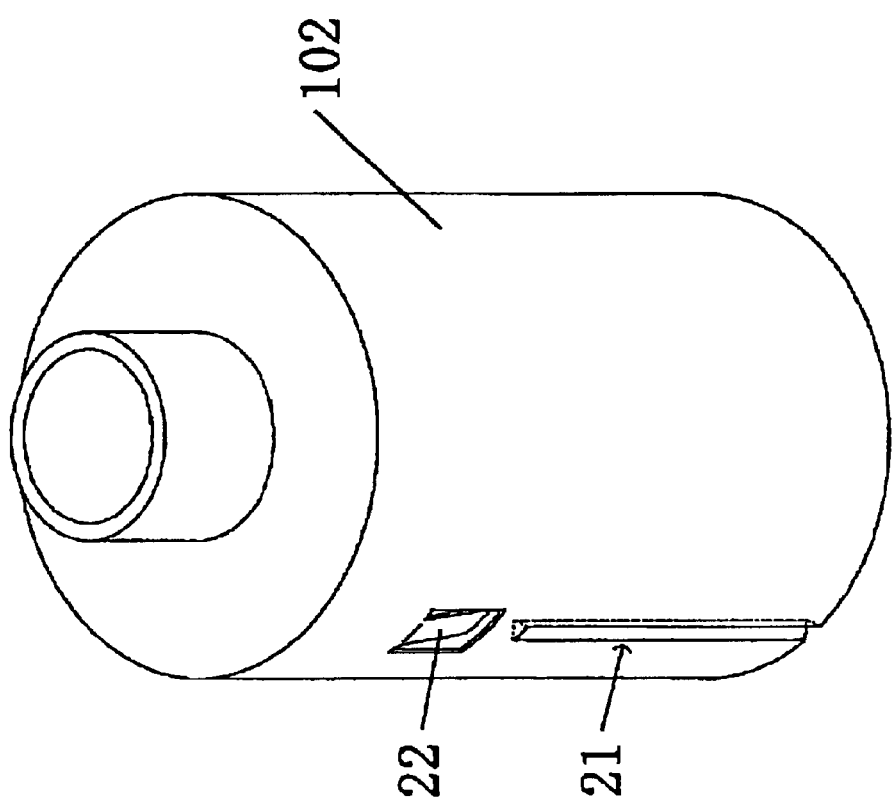
FIG. 11 is a perspective view showing the housing used in the motor in FIG. 6.

As shown in magnified perspective view and perspective view in FIG. 10 and FIG. 11, on the outer peripheral portion of a housing 102, an engaging portion 21 in a V-shape in plan view is formed to project from the outer peripheral surface of the housing 102 in the radial inward direction. The engaging portion 21 has a deformed recess 21a dented in the radial inward direction from the outer peripheral surface of the housing 102 by the pressing force by a die when pressing the outer peripheral surface of the housing 102 in the radial inward direction by the die, and a deformed projecting portion 21b projecting in the radial inward direction from the inner peripheral surface of the housing 102 opposite to the deformed recess 21a in the radial direction. Thus, by forming the engaging portion 21 by pressing process which is plastic deformation, the engaging portion 21 can be formed easily without lowering the forming precision of the engaging portion 21, and the shape of the engaging portion 21 can be changed by adjusting the pressing force in the pressing process.

The axial length of the engaging portion 21 in the housing 102 is formed at least in the same as or longer than the axial length of the stator core stack 132. As shown in FIG. 11, the engaging portion 21 may be formed to the lower end surface in the axial direction of the housing 102.

As shown in FIG. 6 and FIG. 11, a first positioning portion 22 is formed above the axial direction from the engaging portion 21 of the outer peripheral portion of the housing 102. The first positioning portion 22 is dented in the radial inward direction from the outer peripheral surface of the housing 102 by the pressing force by a die when pressing the outer peripheral surface of the housing 102 in the radial inward direction by the die, and is formed by projecting the inner peripheral surface of the housing 102 in the radial inward direction. In FIG. 11, the first positioning portion 22 is formed in part of the outer peripheral portion of the housing 102, but the first positioning portion 22 may be also formed in an annular form in the peripheral direction. Further, the first positioning portion 22 may be formed in the same axial direction as the engaging portion 21 on the outer peripheral portion of the housing 102, or formed somewhere above the axial direction from the engaging portion 21 on the housing 102. In addition, the first positioning portion 102 may be formed in a plurality of two or more positions on the housing 102.

The assembling method of the motor 101 is explained.

First, the upper bearing 151 is press-fitted into the small opening portion 102a of the housing 102. The lower bearing 152 is press-fitted into the plate 108. The stator 103 is inserted from the large opening portion 102b side of the housing 102, and the upper end in the axial direction of the straight core 130 is fitted to the first positioning portion 22.

Figure 12:
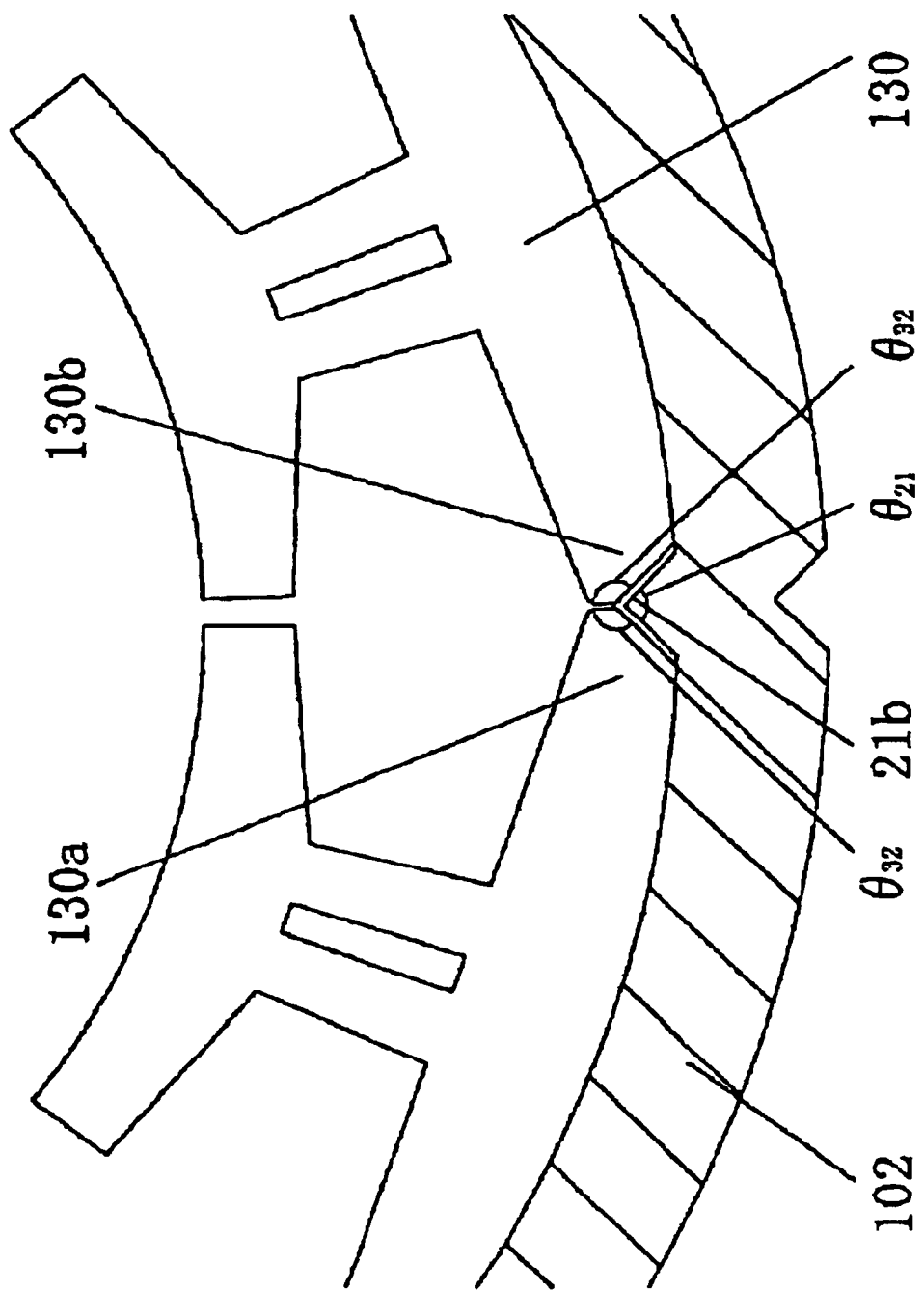
FIG. 12 is a magnified view of a portion B in FIG. 7.
Figure 13:
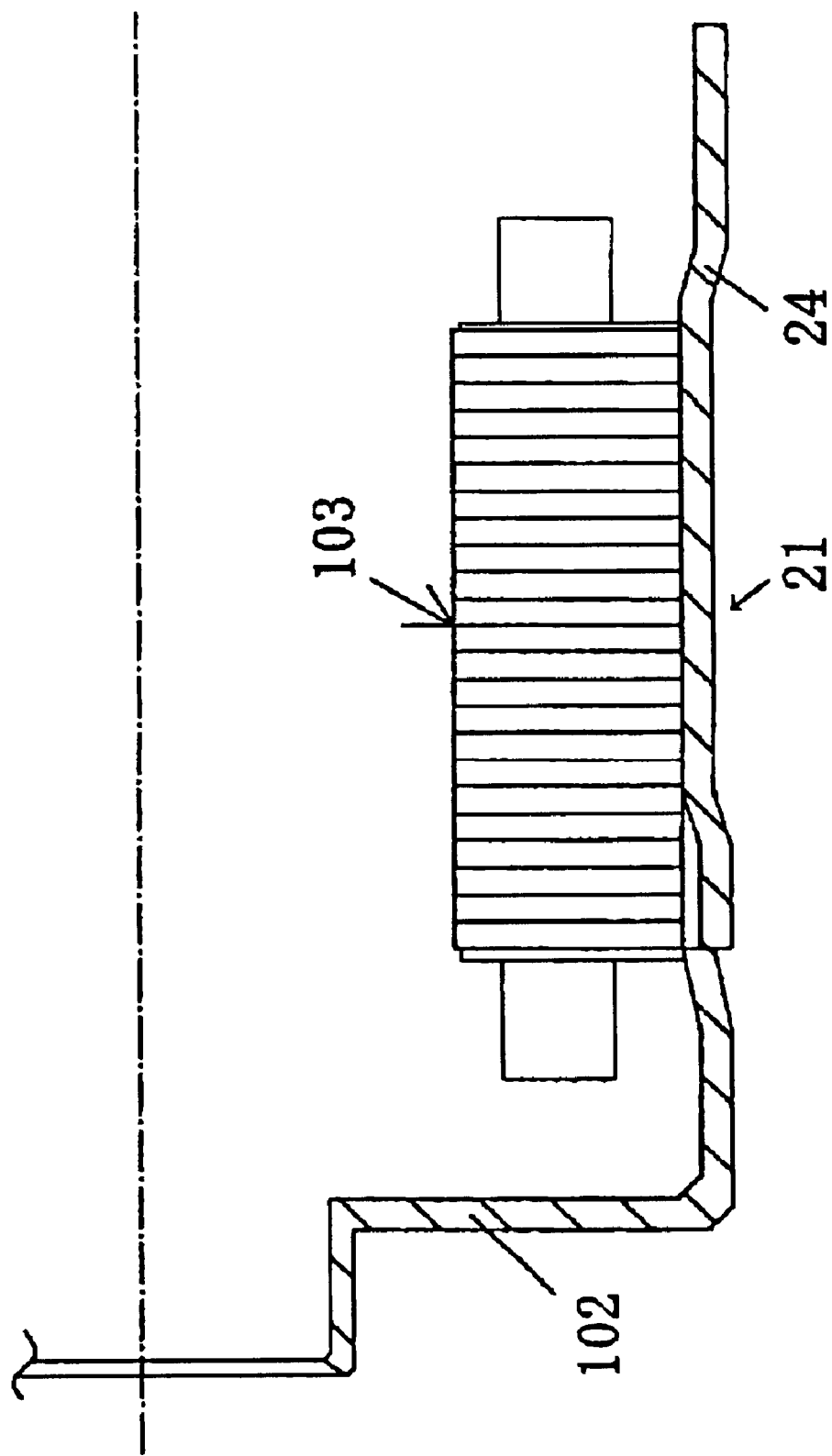
FIG. 13 is a sectional view in an axial direction showing a modified example of the second embodiment of the invention.
Figure 14:
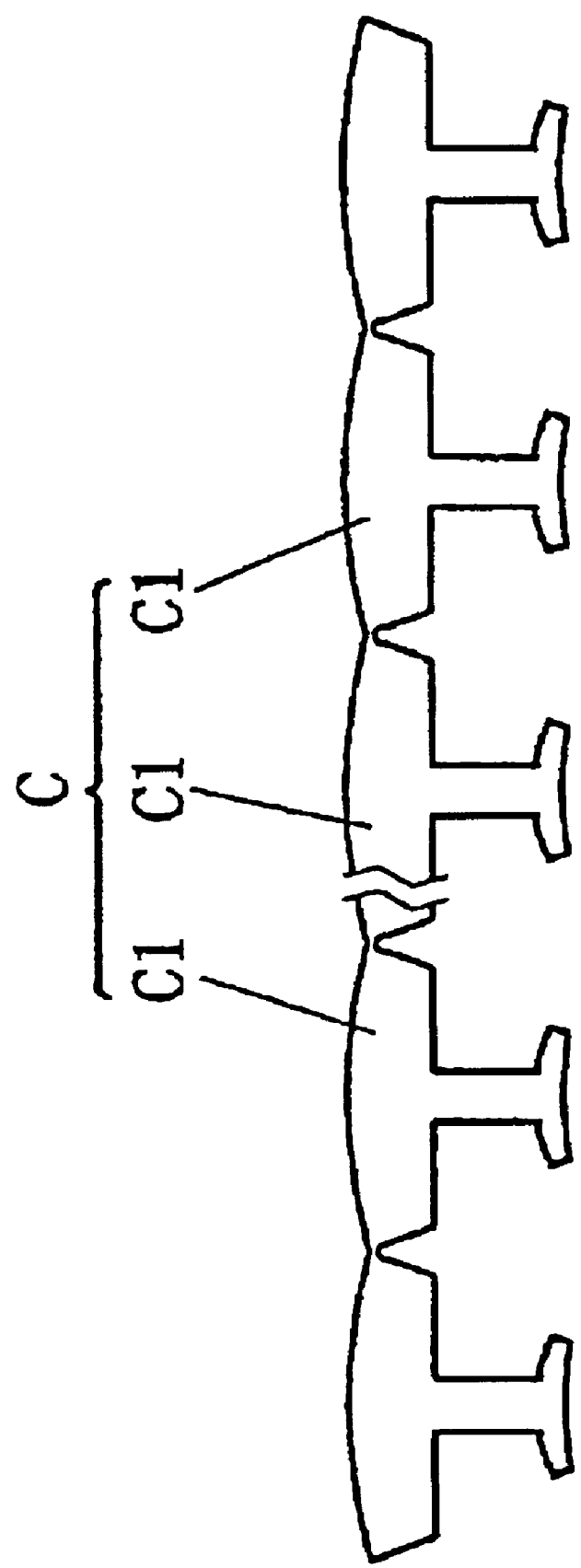
FIG. 14 is a plan view showing a straight core in a conventional motor.
Figure 15:
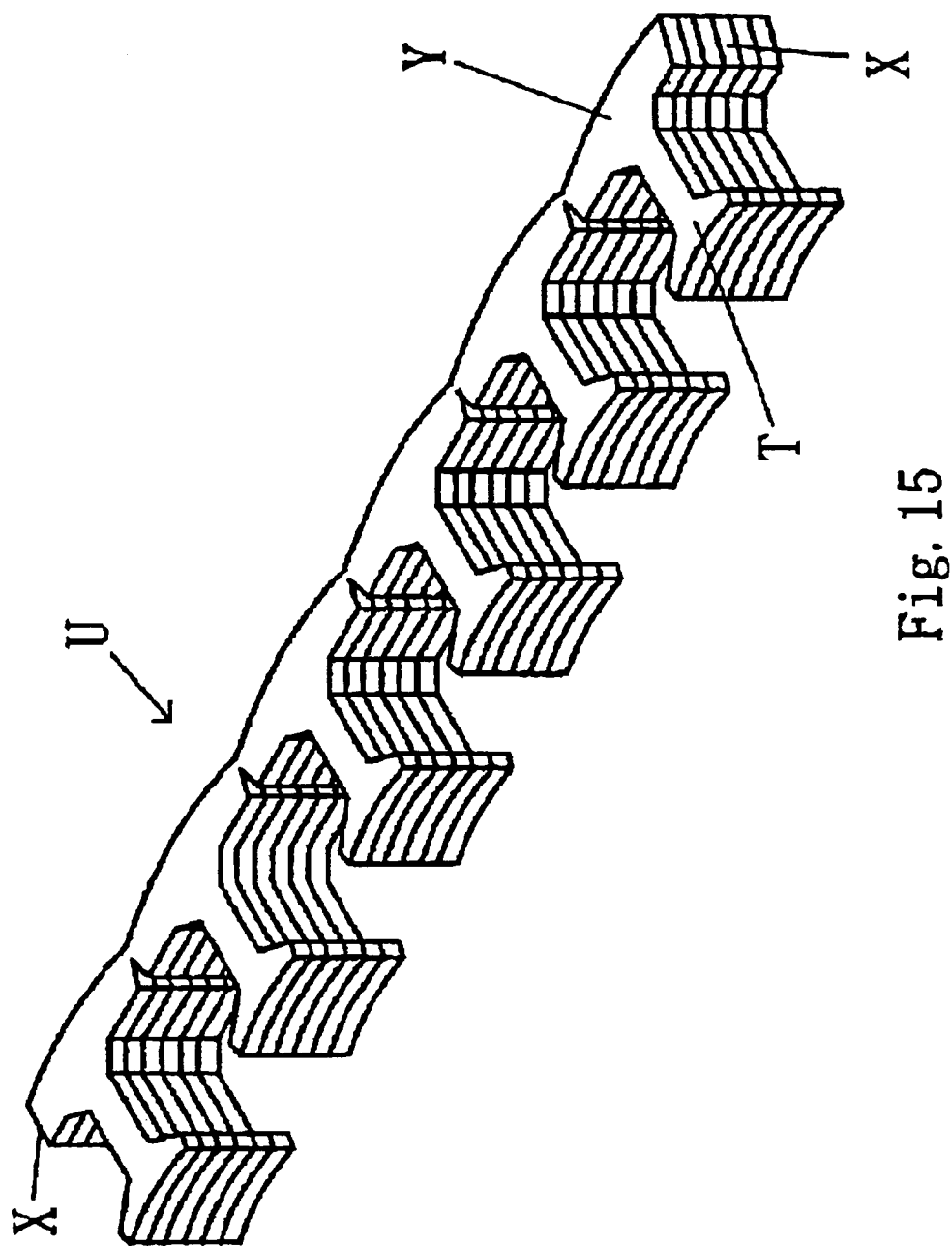
FIG. 15 is a perspective view showing a laminated state of the straight core in the conventional motor.
Figure 16:
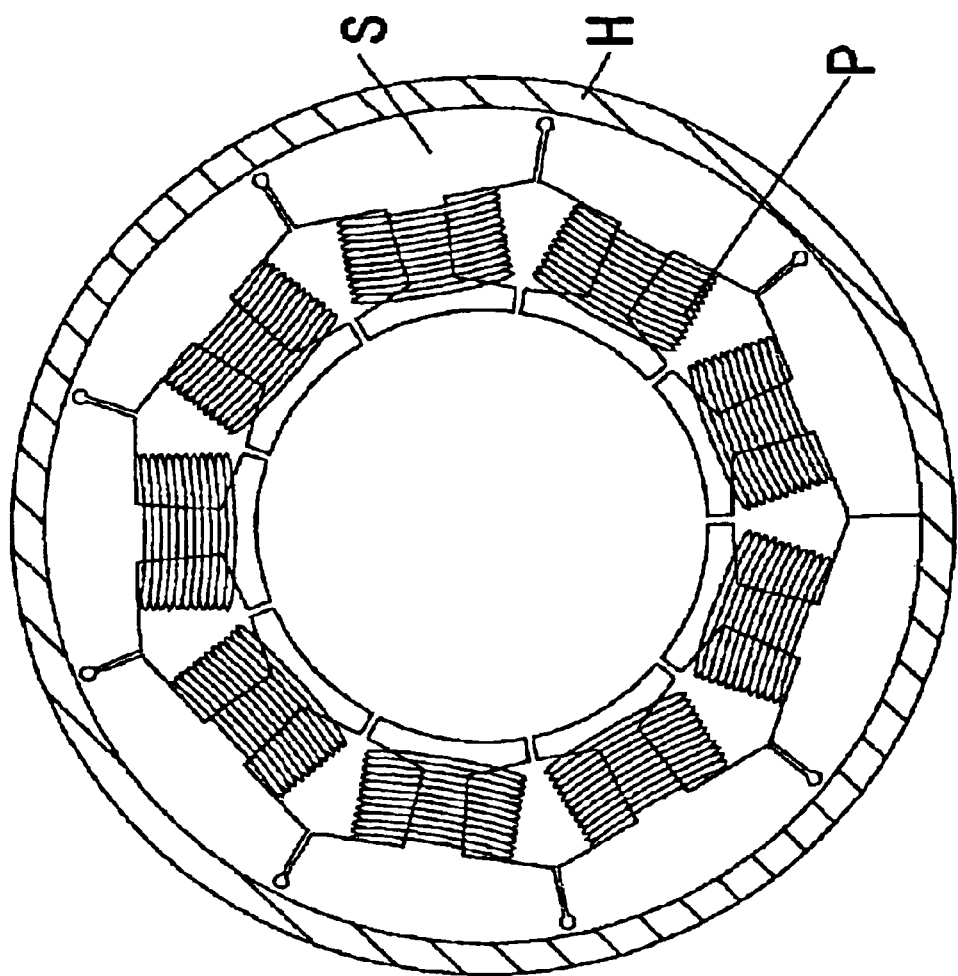
FIG. 16 is a sectional view in a radial direction showing a fixed a state of stator in housing in the conventional motor.

When the stator 103 is inserted in the housing 102, the both end surfaces 130a and 103b of the stator core 130 are engaged or fitted with the deformed projecting portion 21b of the engaging portion 21, and the peripheral position of the stator 103 in the housing 102 can be determined easily, and also after inserting the stator 103 in the housing 102, the stator 103 is prevented from rotating in the peripheral direction. At this time, as shown in FIG. 12 as magnified view of part B in FIG. 7, the deformed projecting portion 21b of the engaging portion 21 of the housing 102 is in contact with the both end surfaces 130a and 130b of the stator 103 as mentioned above, and hence in a plan view, angle θt21 of the deformed projecting portion 21b and angle θt32 of the position of the both end surfaces 130a and 130b of the straight core 130 abutting against the deformed projecting portion 21 are in a relation of approximately (θt21+2θt32)=360 degrees. Accordingly, the side abutting against the both end surfaces 130a and 130b of the deformed projecting portion 21b, and the side abutting against the engaging portion 21 of the both end surfaces 130a and 130b are parallel to each other, and it is easier to fix the stator 103 in the housing 102. Therefore, when the motor 101 rotates, the end surfaces 130a and 103b and the deformed projecting portion 21b are not deviated, and the end surfaces 130a and 103b and the deformed projecting portion 21b are not damaged, so that the stator 103 is securely fixed in the housing 102.

In this embodiment, since the outer peripheral length of the straight core 130 is equal to or shorter than the inner peripheral length of the housing, scoring of the stator 103 and/or housing 102 due to contact of the stator 103 and housing 102 can be prevented. That is, damaging of the stator 103 and/or housing 102 can be prevented. After inserting the stator 103 into the housing 102, a second positioning portion 23 projecting in the radial inward direction is formed near the lower end in the axial direction of the stator 103 on the outer peripheral surface of the housing 102. The second positioning portion 23 is, after the stator 103 is inserted into the housing 102, dented in the radial inward direction from the outer peripheral surface of the housing 102 by the pressing force by a die when pressing the outer peripheral surface of the housing 102 in the radial inward direction by the die, and is formed by projecting the inner peripheral portion of the housing 102 in the radial inward direction. The stator 103 is fixed in the housing 102 and is restricted in the move in the axial direction as the upper end in the axial direction of the straight core 130 abuts against the first positioning portion 22 of the housing 102, and the lower end in the axial direction of the straight core 130 abuts against the second positioning portion 23 of the housing 102.

Consequently, the resin washer 153, the yoke 104 having the magnet 110, and the cap 107 are press-fitted into the rotary shaft 105. In the housing 102 where the stator 103 is fixed, the rotary shaft 105 is accommodated together with the yoke 104 and others, and the leading end of the rotary shaft 105 is inserted into the bearing 151. The circuit board 106 mounting the Hall element 162 and others is fixed in the housing 102, and the metal washer 154 and resin washer 155 are press-fitted beneath the axial direction from the circuit board 106 in the rotary shaft 105. Finally, by closing the housing 102 with the plate 108 having the lower bearing 152, a motor 101 is assembled.

As shown in FIG. 12, meanwhile, a taper-shaped portion 24 extending obliquely from the protrusion 21 to the lower outer peripheral portion of the housing 102 may be formed at the lower end in the axial direction of the protrusion 21 of the housing 102. In this structure, when inserting the stator 103 into the housing 102, it is easier to insert the stator 103, and by contact between the stator 103 and housing 102, scoring of the stator 103 and/or housing 102 can be prevented more securely.

Meanwhile, the leading end in the radial direction of the hill 21b can be projecting in the radial inward direction from the inner peripheral surface of the core back 131a when the stator 103 is deformed annularly. That is, the leading end in the radial direction of the hill 21b can be formed inward of the radial direction (above in FIG. 12) from the inner peripheral surface of the core back 131a.

In these embodiments, one tooth is formed in the core back, but two or more teeth may be formed in the core back. Or after forming the tooth and core back by different members, the tooth may be fixed in the core back.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A motor having a rotation axis comprising:
   a stator core stack formed by laminating a plurality of straight core and curling the straight core circularly, having a core back outer peripheral surface of the core back constituting a circular outer peripheral surface of the stator core stack, laminated teeth protruding radially inwardly from the core back, and a pare of end surfaces situated at both end of the stator core stack and adjoining and opposing each other;
   the straight core comprising a plurality of core pieces linked with adjoining the core pieces at linking portions forming a row of the core pieces, the linking portions being deformable so as to aligned the core pieces disposed circularly, and end edges formed at both end of the row, which constitute the end surfaces when the straight core form the stator core stack;

a windings wound on said laminated teeth of the stator core stack;

a cylindrical housing having a section of an approximately circular inner peripheral surface, a diameter of the circular inner peripheral surface of the section being slightly smaller than the diameter of the outer peripheral surface of the stator core stack; and wherein:

the stator core stack is disposed in the section of the cylindrical housing, and a bar-like member is press-fitted between the end surfaces and expands the diameter of the stator core stack slightly, so as to contact the outer peripheral surface of the stator core stack on the inner peripheral surface of the section of the cylindrical housing.

2. The motor of claim 1, wherein the at least one approximately T-shaped tooth formed in each core back is formed by another member separated from the core back.

3. The motor of claim 1, wherein the both end surfaces have projecting portions for preventing the bar-like member from moving in a radial direction which is perpendicular to the axial direction.

4. The motor of claim 1, wherein the bar-like member is formed in a circular shape in a section perpendicular to the axial direction, both the end surfaces have recessed portions forming a V-shape in a section perpendicular to the axial direction, and the recessed portions linearly contact with the bar-like member in the axial direction.

5. The motor of claim 1, wherein the inner peripheral surface of the housing corresponding to both the end surfaces is formed with a movement restricting portion projecting in the radial direction which goes to the rotation axis from the inner peripheral surface of the hosing between the both end surfaces.

6. The motor of claim 5, wherein the length of the movement restricting portion in the axial direction is at least equal to the length of the stator core stack in the axial direction.

7. A motor having a rotation axis comprising:

a stator core stack formed by laminating a plurality of straight core and curling the straight core circularly, having a core back outer peripheral surface of the core back constituting a circular outer peripheral surface of the stator core stack, laminated teeth protruding radially inwardly from the core back, and a pare of end surfaces situated at both end of the stator core stack and adjoining and opposing each other;

the straight core comprising a plurality of core pieces linked with adjoining core pieces at linking portions forming a row of the core pieces, the linking portions being deformable so as to aligned the core pieces disposed circularly, and end edges formed at both end of said row, which constitute the end surfaces when the straight core plates form the stator core stack;

a windings wound on the laminated teeth of the stator core stack;

a cylindrical housing having a section of an approximately circular inner peripheral surface, a diameter of the circular inner peripheral surface of the section being slightly smaller than the diameter of the outer peripheral surface of the stator core stack, and an engaging portion extending in an axial direction and projecting in a radially inward direction which goes to the rotation axis from the inner peripheral surface of the section, and wherein:

the stator core stack is disposed in the section of the cylindrical housing, and the engaging portion is press-fitted between the end surfaces and expands the diameter of the stator core stack slightly, so as to contact the outer peripheral surface of the stator core stack on the inner peripheral surface of the section of the cylindrical housing.

8. The motor of claim 7, wherein the at least one approximately T-shaped tooth formed in each core back is formed by another member separated from the core back.

9. The motor of claim 7, wherein said engaging portion has a deformed projecting portion forming a V-shape in section perpendicular to the axial direction, and a notched portion is formed in the edge of the back side of both the end surfaces of the straight core.

10. The motor of claim 9, wherein the notched portion is formed in parallel to the deformed projecting portion, and the deformed projecting portion and the notched portion linearly contact with each other in the axial direction.

11. The motor of claim 7, wherein the length of the engaging portion in the axial direction is equal to or longer than the length of the stator core stack in the axial direction.

12. The motor of claim 7, wherein said engaging portion is formed by plastic deformation on a outer peripheral surface of the housing.

13. The motor of claim 7, wherein the housing comprise a upper portion and a lower portion in the axial direction, a taper portion which inclines in the lower portion of the housing from the engaging portion is formed in the engaging portion, and the taper portion is formed simultaneously when forming the engaging portion.

14. The motor of claim 7, wherein at least one first positioning portion projecting from the inner peripheral surface of the housing in the radial direction is formed at the upper portion of the housing, and said the first positioning portion restricts movement of the stator core stack in the axial direction.

15. The motor of claim 14, wherein said first positioning portion is formed in two or more positions on the housing.

16. The motor of claim 7, wherein said first positioning portion is formed by plastic deformation on the outer peripheral surface of the housing.

17. The motor of claim 7, wherein a second positioning portion projecting from the inner peripheral surface of the housing in the radial direction is formed at the lower portion of the housing, and the second positioning portion restricts movement of the stator in the axial direction.

18. The motor of claim 17, wherein the second positioning portion is formed by plastic deformation on the outer peripheral surface of the housing.

* * * * *